(12) United States Patent
Zhang (10) Patent No.: US 10,060,314 B2
(45) Date of Patent: Aug. 28, 2018

(54) EXHAUST SOOT CONTROL SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 683 days.

(21) Appl. No.: 14/563,163

(22) Filed: Dec. 8, 2014

(65) Prior Publication Data

US 2016/0160721 A1   Jun. 9, 2016

(51) Int. Cl.
| | |
|---|---|
| *F01N 3/00* | (2006.01) |
| *F01N 3/02* | (2006.01) |
| *F01N 3/033* | (2006.01) |
| *F01N 9/00* | (2006.01) |
| *F01N 3/027* | (2006.01) |

(52) U.S. Cl.
CPC ............. *F01N 3/033* (2013.01); *F01N 3/027* (2013.01); *F01N 9/002* (2013.01); *F01N 2560/05* (2013.01); *F01N 2560/20* (2013.01); *F01N 2900/1606* (2013.01); *F02D 2200/0812* (2013.01); *Y02T 10/47* (2013.01)

(58) Field of Classification Search
CPC ............. F01N 2560/05; F01N 2560/20; F01N 2900/1606; F01N 3/027; F01N 3/033; F01N 9/002; F02D 2200/0812; Y02T 10/47

USPC .................................. 60/276, 295, 297, 311
See application file for complete search history.

(56) References Cited

U.S. PATENT DOCUMENTS

| | | | |
|---|---|---|---|
| 4,426,673 A | 1/1984 | Bell et al. | |
| 7,017,338 B2 | 3/2006 | van Nieuwstadt | |
| 7,886,610 B2 * | 2/2011 | Gustafson | G01L 9/0089 73/736 |
| 8,310,249 B2 * | 11/2012 | Paterson | F02D 41/1466 324/693 |
| 8,478,565 B2 | 7/2013 | Ardanese et al. | |
| 2013/0312389 A1 | 11/2013 | Yanakiev et al. | |

\* cited by examiner

*Primary Examiner* — Audrey K Bradley
*Assistant Examiner* — Diem Tran
(74) *Attorney, Agent, or Firm* — Julia Voutyras; McCoy Russell LLP (57) ABSTRACT

Systems and methods are described for sensing soot (particulate matter) in an exhaust system of a vehicle. An example system comprises a sensor housing an exhaust inlet, an exhaust outlet, and a soot filter affixed across the exhaust outlet, and a piston with the housing, affixed to a spring via a conductive surface, the spring fluidly separated from the exhaust chamber by a piston seal. The system may further comprise a detection circuit including the conductive surface of a piston and a plurality of resistive elements and a separate regeneration circuit configured to supply electric heat across the soot filter to regenerate the sensor.

10 Claims, 6 Drawing Sheets

EXHAUST SOOT CONTROL SYSTEM

BACKGROUND AND SUMMARY

Engine combustion may generate soot, which can be exhausted to the atmosphere. To reduce soot emissions, a particulate filter may be used. To sense the soot produced and/or released, a soot sensor may be used.

Soot sensors may include various types. For example, as described by U.S. Pat. No. 8,310,249, soot sensors collect particles on charged electrodes. In one example, a soot sensing arrangement for includes a pair of spaced apart electrodes having an insulator interposed therebetween, where the first electrode, second electrode and insulator extend into the exhaust flow. As the exhaust flow impinges on the first electrode, second electrode and insulator, any soot or particulate therein can likewise impinge thereon. A voltage supply operably coupled to the first and second electrodes provides a predetermined voltage between the first and second electrodes and a current sensor operably coupled to the first and second electrodes senses current between the first and second electrode. The soot sensor may then be regenerated.

The inventor herein has recognizes disadvantages with the above approach. For example, non-uniform soot deposit on the surface can occur due to bias flow distribution across the sensor surface, resulting in inaccurate voltage and current readings across the gap. Additionally, or alternatively, it can be difficult to reach sensor regeneration temperature due to large flow impingement on the surface in some sensor designs. Further still, contamination may be problematic due to large particulate or water droplet impingement on the sensor surface.

At least some of the above issue may be at least partially addressed by a method, comprising: collecting soot particles on a sensor surface downstream of a particulate filter to increase pressure inside the sensor; and repeatedly regenerating the sensor surface to indicate soot level responsive to a translated piston upon which the pressure acts. In some examples, exhaust exits the sensor via an exhaust outlet that is perpendicular to an exhaust inlet. In this way, it is possible to reduce the effects of biased flow distribution across the sensor while also reducing exhaust cooling effects and large particulate or water droplet impingement. For example, the sensor surface can be positioned perpendicular to the inlet thereby reducing the potential for impingement and uneven exhaust flow. Likewise, by correlating the pressure rise with soot storage, rather than current and/or voltage correlations related to conductivity across a gap or other similar structure, the sensor may be less sensitive to aberrant storage distribution levels on the surface. However, such pressure correlation may also be used in addition to conductivity across electrode gaps, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
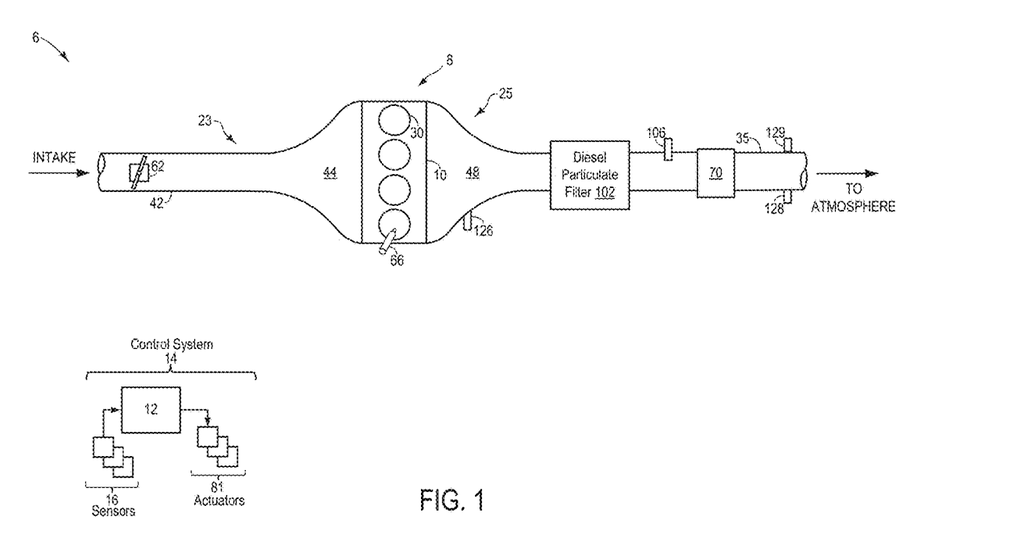
FIG. 1 shows a schematic diagram of an engine and an associated pressure-based soot sensor downstream of the diesel particulate filter.
Figure 2:
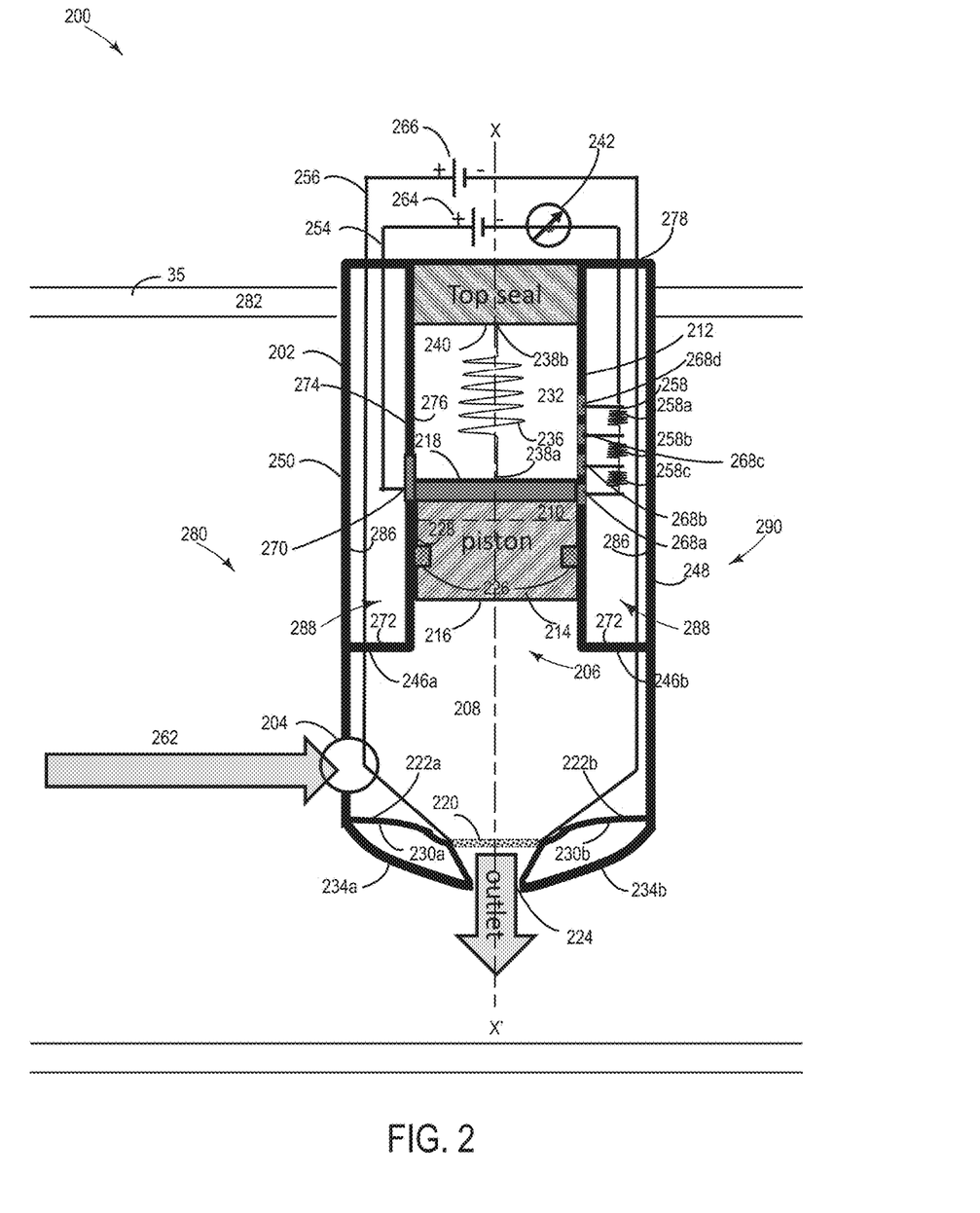
FIG. 2 shows an example embodiment of the pressure-based soot sensor assembly in accordance with the present disclosure.
Figure 4:
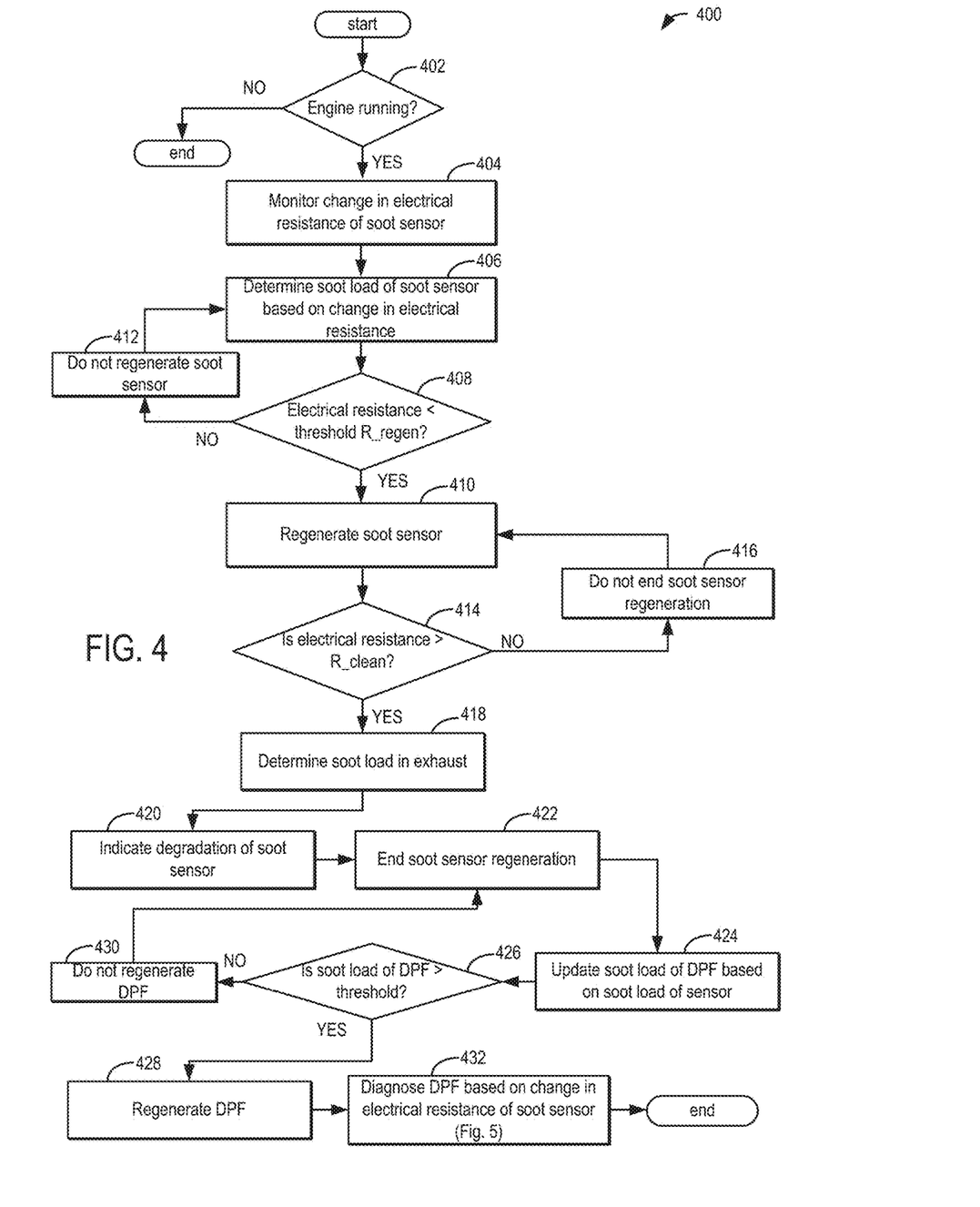
FIGS. 4-5 are example flow charts illustrating routines that may be implemented for controlling and diagnosing filter regeneration and functionality, using the pressure-based soot sensor.
Figure 5:
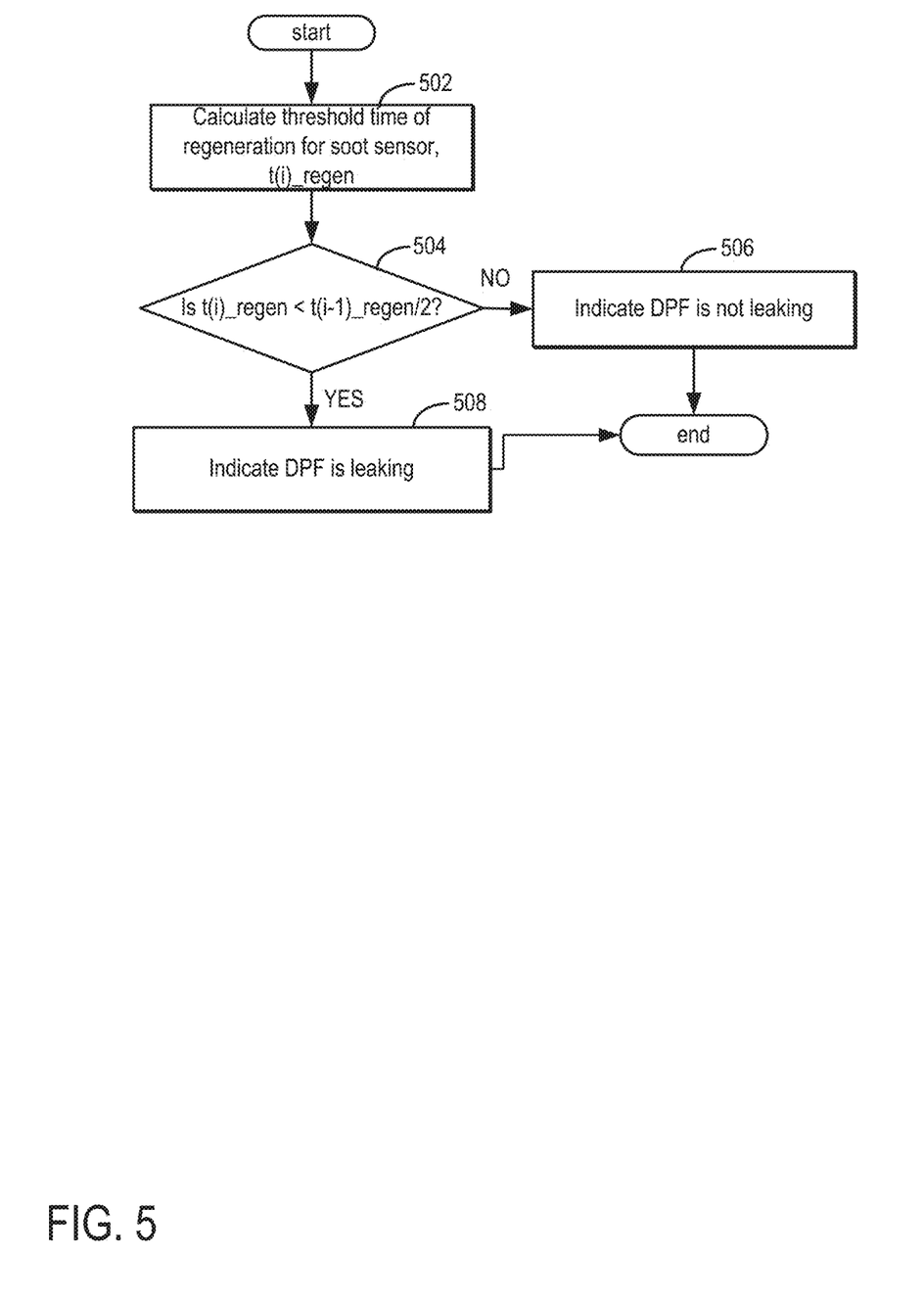
Figure 6:
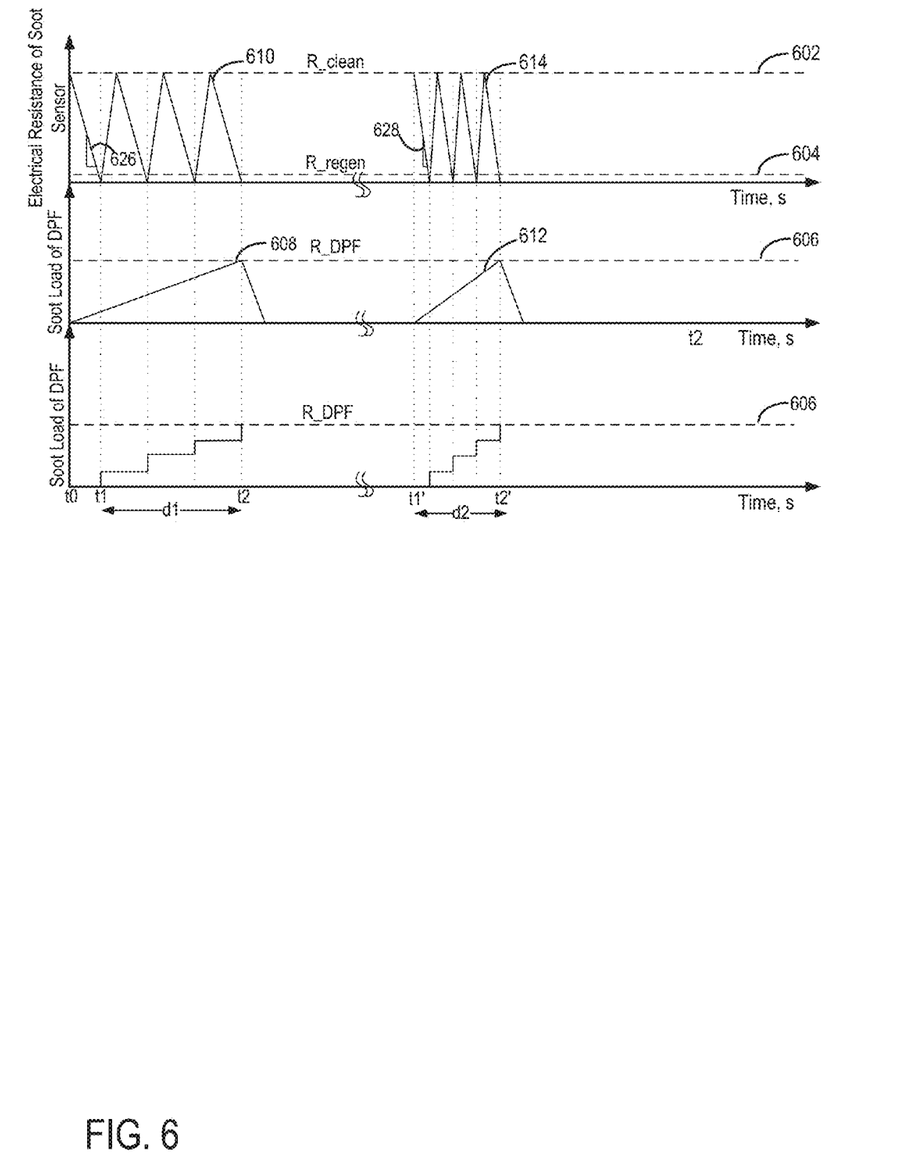
FIG. 6 shows a graphical depiction of soot sensor regeneration and diesel particulate filter operation.

The following description relates to systems and methods for controlling a particulate matter (PM) retaining system, such as the diesel particulate filter of FIG. 1. As shown therein, the PM retaining system may include a diesel particulate filter (DPF) and a pressure-based soot sensor positioned downstream of the filter. As shown in FIG. 2, the pressure-based soot sensor intakes a portion of the exhaust gas, where the soot (particulate matter) accumulates onto its filter as the exhaust gas exits the sensor assembly through the outlet. Specifically, the exhaust gas flows from the outlet of the particulate filter to the upstream-facing inlet of the soot sensor assembly. The pressure based soot sensor assembly may be constructed in such a way as the exhaust outlet faces radially into a centerline of the exhaust passage. The accumulation of the soot in the soot sensor filter decreases the filter flow permeability, increasing the pressure inside the sensor chamber. With an increase of pressure, the piston inside the inner tube rises (FIG. 3), effectively acting as a potentiometer in a detection circuit, which is coupled to a voltage sensor. Another separate circuit supplies electric heat across the soot filter in order to regenerate the filter when resistance lowers to a predetermined threshold. A processor (which may be part of a controller) coupled to the soot sensor may send an output to the regeneration circuit to start sensor regeneration. In this way, the pressure-based soot sensor may be advantageously used to accurately control filter functionality and regeneration efficacy. A processor may further monitor the time between consecutive regenerations of the soot sensor, thereby monitoring DPF function in effect (FIGS. 4-6). By reducing the need for soot to accumulate in an electric circuit, which can experience poor soot distribution, this system may increase the sensor's sensitivity and accuracy in detecting DPF degradation.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Engine exhaust 25 may also include diesel particulate filter 102, which temporarily filters PMs from entering gases, positioned upstream of emission control device 70. In one example, as depicted, DPF 102 is a diesel particulate matter retaining system. Tailpipe exhaust gas that has been filtered of PMs, following passage through DPF 102, may be measured in the soot sensor 106 (or particulate matter sensor) and further processed in emission control device 70 and expelled to the atmosphere via exhaust passage 35.

DPF 102 may have a monolith structure made of, for example, cordierite or silicon carbide, with a plurality of channels inside for filtering particulate matter from diesel exhaust gas.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as additional pressure, temperature, air/fuel ratio, and composition sensors may be coupled to various locations in the vehicle system 6. As another example, the actuators may include fuel injectors 66, throttle 62, DPF valves that control filter regeneration (not shown), etc. The control system 14 may include a controller 12. The controller may receive input data from the various sensors, process the input data, and trigger the actuators in response to the processed input data based on instruction or code programmed therein corresponding to one or more routines.

FIG. 2 (not to scale) shows a schematic view of an example embodiment of pressure-based soot sensor assembly 200. Pressure based soot sensor assembly 200 may be pressure based soot sensor 106 of FIG. 1 and therefore may share common features and/or configurations as those already described for soot sensor 106. It may be appreciated that pressure based soot sensor assembly 200 is shown in simplified form by way of example and that other configurations are possible.

Pressure based soot sensor assembly 200 is coupled with engine exhaust passage 35 downstream of DPF 102, such that exhaust gases are flowing from the left hand side of FIG. 2 to the right hand side of FIG. 2 as indicated by arrow 262. Pressure-based soot sensor assembly 200 may include outer tube 202 with exhaust inlet 204 on an upstream surface 250. Exhaust inlet 204 may serve as an intake aperture for sampling exhaust gases for particulate matter. Upstream surface 250 of outer tube 202 is substantially normal to and facing the flow of oncoming exhaust gases (arrow 262) in exhaust passage 35 of FIG. 1. Thus, upstream surface 250 may be in direct contact with exhaust flow, and exhaust gases exiting DPF 102 may flow in an unobstructed manner towards upstream surface 250 of outer tube 202 of pressure based soot sensor assembly 200. Thus, a portion of exhaust gases for sampling may be conducted via exhaust inlet 204 into pressure based soot sensor assembly 200. Outer tube 202 may not include any apertures on its downstream surface 248, but may have an exhaust outlet on the bottom surface of outer tube 202, facing radially into a centerline of exhaust passage 35.

Pressure based soot sensor assembly 200 further comprises inner tube 212 fully enclosed within outer tube 202. Inner tube 212 may be positioned such that a central axis of inner tube is parallel to a central axis of outer tube 202. In the example shown in FIG. 2, a central axis X-X' of inner tube coincides with, and may be the same as, corresponding central axis X-X' of outer tube 202 resulting in a concentric arrangement of inner tube with outer tube. Therefore, an annular space 288 may be formed between outer tube 202 and inner tube 212. Specifically, the annular space may be formed between an outer surface 274 of inner tube 212 and the inner surface 286 of outer tube 202. In alternative embodiments, the central axis of outer tube 202 may not coincide with, but may be parallel to, the central axis of inner tube 212. However, an annular space between the outer tune and the inner tube may be maintained.

Annular space 288 formed between outer tube 202 and inner tube 212 may be enclosed by an annular surface 272. This surface may extend from inner surface 286 of outer tube 202 to outer surface 274 of inner tube 212, therein sealing the annular space at a location that may correspond to the end of inner tube 212. Annular surface 272 may be circular, such that it encloses the annular space from the outer circumference of inner tube 212 to the inner circumference of outer tube 202. Further, annular surface 272 may be of the same thickness as that of the inner or outer tube, or it may be of a different thickness. Additionally, the surface may be comprised of the same metal as the inner or outer tube, or of a different material. The hollow, annular space may be enclosed at the top by top surface 278 of outer tube 202.

Annular space 288 may contain portions of electric circuit 254 and electric circuit 256, as well as resistive elements 258. Electric circuit 254 passes from the positive terminal of a voltage source 264 and loops to the negative terminal. Specifically, top surface 278 of outer tube 202 may provide an inlet for electric circuit 254 above the annular space on an upstream side 280. The electrical wire is electrically coupled to conductive surface 270 on the outer surface 274 of inner tube 212, which in turn is coupled to conductive surface 218. The electrical current then passes through to the plurality of conductive surfaces 268a, 268b, 268c, or 268d on the exterior surface of inner tube 212. Specifically, the current may pass through one of the conductive surfaces, dependent on the position of conductive surface 218. The conductive surfaces 268a, 268b, 268c, and 268d are coupled to a plurality of resistive elements 258. The conductive surfaces may be spaced apart from one another equidistantly with even spaces or irregularly spaced, if desired. The electrical circuit continues through the plurality of resistive elements in the annular space on a downstream side 290. The wire exits through an outlet of top surface 278 of outer tube 202 above the annular space. A voltage sensor 242 reads the voltage before the current loops back to the negative terminal of voltage source 264 coupled to top surface 278 of outer tube 202. The voltage sensor may be, for example, an electrometer.

In a similar fashion, top surface 278 of outer tube 202 provides an inlet for an electrically separate and distinct circuit, electric circuit 256. The circuits may share several common locations, but are not electrically coupled to one another, but rather insulated from one another. The electrical wire of electric circuit 256 passes from a positive terminal of voltage source 266 through the annular space on upstream side 280. The electrical wire exits the annular space via an outlet on a cross section diameter 246a of annular surface 272. Cross section diameter 246a of annular surface 272 represents a diameter from an upstream surface 250 of the outer tube 202 to an outer surface 274 of the inner tube 212. The electrical wire is coupled to the soot sensor filter 220 on one end, and the wire continues from the other end of the filter. The electrical wire passes through an inlet at cross section diameter 246b of annular surface 272. Cross section diameter 246*b* represents a diameter from a downstream surface 248 of outer tube 202 to outer surface 274 of inner tube 212. The electrical wire then passes through an outlet of top surface 278 of outer tube 202 above the annular space and to the negative terminal of its voltage source.

The inlets and outlets for the electrical wires may be channeled through the annular surface and top surface of the outer tube, for example. The apertures from which the wires pass through may be filled with a sealant, thereby providing a hermetic seal between the wires and the corresponding apertures. The sealant may also prevent gases in bottom chamber 208 from rising in to the annular space. There may be two distinct apertures for electric circuit 254 and electric circuit 256 on top surface 278 of outer tube 202 serving as inlets into the sensor assembly above an annular space, towards the upstream side. There may also be two distinct apertures serving as the outlets for the electric circuits on top surface 278 above an annular space on downstream side 290. Further, there may be an outlet aperture on a cross section diameter 246*a* for electric circuit 256 to enter bottom chamber 208. An inlet aperture on cross section diameter 246*b* may serve as an exit from the bottom chamber for electric circuit 256. Further, the voltage sources for the circuits and the voltage sensor are coupled to top surface 278 of outer tube 202, and may therefore be above exhaust passage 35.

In the example of FIG. 2, each of outer tube 202 and inner tube 212 may have circular cross-sections. In one example, outer tube 202 and inner tube 212 may be hollow, cylindrical tubes formed from metal capable of withstanding higher temperatures in the exhaust passage. In another example, alternative materials may be used. Further still, each of the outer tube and inner tube may be formed from distinct material.

Pressure based soot sensor assembly 200 extends radially into exhaust pipe 282. The sensor may be coupled to exhaust passage 35 (FIG. 1) in a suitable manner such that downstream surface 248 and upstream surface 250 of outer tube 202 are joined to the roof of exhaust pipe 282. The surfaces may be joined by welding in one example, or joined via alternative methods such as brazing, adhesion, etc. The sensor assembly and exhaust passage wall are coupled such that top surface 278 of outer tube 202 may be above the exhaust passage wall.

In other examples, pressure based soot sensor assembly 200 may be located in alternate positions along exhaust pipe 282. Further, pressure based soot sensor assembly 200 may be coupled to a connector assembly (not shown) which may be operatively coupled to the controller.

Inner tube 212 features a bottom open end 206 which is normal to and facing the inner bottom chamber 208 of outer tube 202. Bottom open end 206 may be analogous to a cap-less end of a cylinder. Inner tube 212 is located within outer tube 202 and therefore is not in direct contact with exhaust flow in exhaust passage 35 of FIG. 1. However, bottom open end 206 of inner tube 212 may be in direct contact with the portion of exhaust gases conducted via exhaust inlet 204 of outer tube 202. Therefore, the portion of exhaust conducted into pressure based soot sensor assembly 200 via exhaust inlet 204 of outer tube 202 is in direct contact with bottom open end 206 on inner tube 212, which is sealed by piston 214.

Pressure based soot sensor assembly 200 further includes a piston 214 located in inner tube 212, effectively functioning as a seal for the bottom of inner tube 212. Piston 214 is circular, and may be cast from a metal alloy (aluminum alloy, for example). A central axis X-X' of piston 214 coincides with, and may be the same as, corresponding central axis X-X' of outer tube 202 and of inner tube 212, resulting in a concentric arrangement of piston with inner tube and with outer tube. Bore 210 is the diameter of piston 214, which may correspond to the diameter of the inside of inner tube 212. Piston 214 is coupled with conductive surface 218, which is affixed to the top of the piston, inside top chamber 232 and parallel with exhaust outlet 224. Further, piston 214 may be machined with a groove (or multiple grooves, for example) along its outer circumference (not show in FIG. 1). The groove (or grooves) may house piston seal 226, which couples piston 214 annularly. Piston seal 226 may be designed according to certain parameters, including but not limited to operating temperature and sealing pressure, for example. Further, the seal may be comprised of fluorocarbon Viton®, or other such material that may be able to withstand higher temperatures. Piston seal 226 may provide a sliding seal between the outer surface 228 of piston 214 and inner surface 276 of inner tube 212, and fluidly separates top chamber 232 of inner tube 212 and the components therein.

Exhaust inlet 204 introduces a portion of the exhaust gas into the sensor assembly's bottom chamber 208. Bottom chamber 208 is confined by the downstream surface 248 and upstream surface 250 of outer tube 202 laterally. With respect to the vertical, bottom chamber 208 is confined by annular surface 272, with piston bottom surface 216 centered in between at the top, and filter guarder 222*a* and 222*b* with a filtered exhaust outlet 224 in between at the bottom. Thus, when exhaust gas flows through exhaust inlet 204, which is located at the bottom of outer tube 202 and into bottom chamber 208, the gas may only flow through to exhaust outlet 224 of outer tube 202. Thus, exhaust inlet 204 faces the outlet of the particulate filter, wherein a portion of the exhaust gas enters through the inlet, into the bottom chamber of the sensor assembly, and exits through the filtered outlet, which faces radially into a centerline of exhaust passage 35. In this embodiment, the exhaust outlet is perpendicular to the exhaust inlet and parallel with the conductive piston surface.

Pressure based soot sensor assembly may be sealed at its top surface (with respect to the vertical) by top seal 240. Specifically, this seals the top chamber 232 of inner tube 212 and the sensor components housed therein in order to reduce leakage of exhaust gases from exhaust passage into the atmosphere. Further, the pressure based soot sensor assembly maybe formed in a manner such that the sole unsealed openings on outer tube 202 are exhaust inlet 204 and exhaust outlet 224.

Particulate matter from the exhaust gas that is introduced into bottom chamber 208 accumulates in soot sensor filter 220, which is affixed across exhaust outlet 224, between filter guarders 222*a* and 222*b*. The soot filter surface may be flat and disk-shaped, comprised of metal fibers, for example, without any through holes. Specifically, in one example, the filter may be comprised of a porous sintered metal that physically traps particulate matter. Porous metal filter elements can be manufactured in a wide variety of materials depending on the requirement (for example, filter grade pertaining to porosity and permeability, pore size distribution, etc.). The filter may be comprised of, for example, stainless steel alloys as well as nickel and/or titanium. As an alternative embodiment, soot sensor filter 220 may be comprised of wire mesh or corrugated wrapped layers of metal foils. Metal fiber cores may be advantageous in that the soot sensor filter can regenerate by a an electrical current that passes through it, which can be used with higher exhaust temperature and/or may reduce the need for the higher exhaust temperatures and/or higher exhaust flow rates to regenerate the filter. Thus the soot sensor filter effectively traps particulate matter (or soot) in its pores as exhaust gas flows from the outlet of DPF 102, into exhaust inlet 204, and out of exhaust outlet 224. Filter guarders 222a and 222b may be comprised of insulation material (for example, polymer composites) to minimize heat transfer from filter to outer tube. The filter guarders are coupled to the left and right of soot sensor filter 220, and are enclosed by bottom chamber surfaces 230a and 230b and outer tube surfaces 234a and 234b. Soot accumulation in the filter decreases filter flow permeability, thus increasing the backpressure inside bottom chamber 208 due to increased flow resistance through the outlet caused by soot buildup at 220. As pressure increases, piston 214, affixed to spring 236 via conductive surface 218, will be have a larger force pushing upward from the increased pressurization of exhaust inside the sensor, the upward force reacted against the force of a spring resulting in vertical motion of the piston.

Note that while the present disclosure refers to upward force, this is with respect to the orientation of FIG. 2 and along axis X-X'. However, other orientations are possible, as already explained.

Further, soot sensor assembly 200 may house spring 236, which is fluidly separated from the exhaust chamber by piston seal 226. Bottom spring end 238a is affixed to conductive surface 218, and top spring end 238b is affixed to top seal 240, which may seal off any atmospheric pressure. The spring ends may be affixed, for example, by hooks (not shown) to attach the spring ends to each surface or by threading a closed end coil spring onto a threaded shaft (not shown). Spring 236 may be a compression coil spring in a helical shape, comprised of spring steel for example. Compression spring ends may be closed and square. The ends of the compression spring may also be close wound for a certain number of coils on the ends permitting the spring to remain in a vertical position. Spring 236 may resist a compressive force applied axially. A central axis X-X' of spring 236 coincides with, and may be the same as, corresponding central axis X-X' of piston 214, of outer tube 202 and of inner tube 212, resulting in a concentric arrangement of spring with piston with inner tube and with outer tube. Compression spring parameters, such as, but not limited to, spring wire diameter, inner and outer diameter, free length, solid height, and spring rate (or stiffness) may be calculated by a compression spring rate formula, for example, with respect to a threshold pressure force in bottom chamber 208. When the force of the pressure inside the chamber is greater than that of the force of the spring, piston 214 compresses spring 236 proportional to the amount of pressure in bottom chamber 208. As piston 214 is pressurized upward, electrical resistance decreases across the conductive surface 218 as measured by voltage sensor 242, which is affixed to electric circuit 254.

As piston 214 is pressurized upward, electric resistance lowers across conductive surface 218. This may be due to its position relative to resistive elements 258, affixed to electric circuit 254, right after the current flows through conductive surface 218 of piston 214. The movement of the piston 214 via spring 236 effectively acts as potentiometer, varying the resistance in the circuit depending on the position of the piston. When piston 214 is in its lowest position, which may correspond with the free length of spring 236, conductive surface 218 is electrically coupled to conductive surface 268a of the inner tube. Conductive surface 268a may be affixed at the end of resistive elements 258. Thus, a current flows through resistors 258a, 258b, and 258c, accounting for the highest electrical resistance reading on voltage sensor 242 (it may be appreciated that resistance may calculated from the voltage reading of the voltage sensor 242). The current continues to flow across the wire of electric circuit 254 to reach the negative terminal of voltage source 264, which is located on top surface 278 of outer tube 202.

As a piston moves upward via pressure-forced compression of spring 236, its conductive surface is electrically coupled with conductive surface 268b (whose current flow then passes through resistors 258a and 258b). A piston top encounters conductive surface 268c on the next higher level (attached to resistor 258a), and then conductive surface 268d on the highest level (not attached to a resistor). Resistive elements 258 may comprise of three resistors (or a plurality of resistive elements) connected in a series. Thus electric circuit 254 is used effectively as a degradation detection circuit, where a low resistance measurement in electric circuit 254 (a value lower than that of threshold value, R_regen) will signal soot sensor regeneration to start (via a controller coupled to the soot sensor). Moreover, the frequency of sensor regeneration can signify diesel particulate filter degradation. Thus, pressure in bottom chamber 208 increases with increased soot accumulation as filter flow permeability decreases, pressurizing piston 214 upward via the compression of spring 236.

Electric circuit 256 is a regeneration circuit, separate from electric circuit 254, configured to supply electric heat across soot sensor filter 220 in order to perform sensor regeneration by burning off the particulates accumulated in the soot sensor filter. Voltage source 266 supplies electric circuit 256 with voltage. A controller coupled to soot sensor assembly 200 may provide instructions to the regeneration circuit responsive to the soot level data. For example, when a resistance measured via voltage sensor 242 reaches a predetermined threshold R_regen, a controller may provide current to electric circuit 256 to activate the heating element. A current may provide heat at a temperature high enough to burn off (or incinerate) the accumulated particulate matter. Thus, electric circuit 256 may reduce the soot particles stored in soot filter 220.

Figure 3:
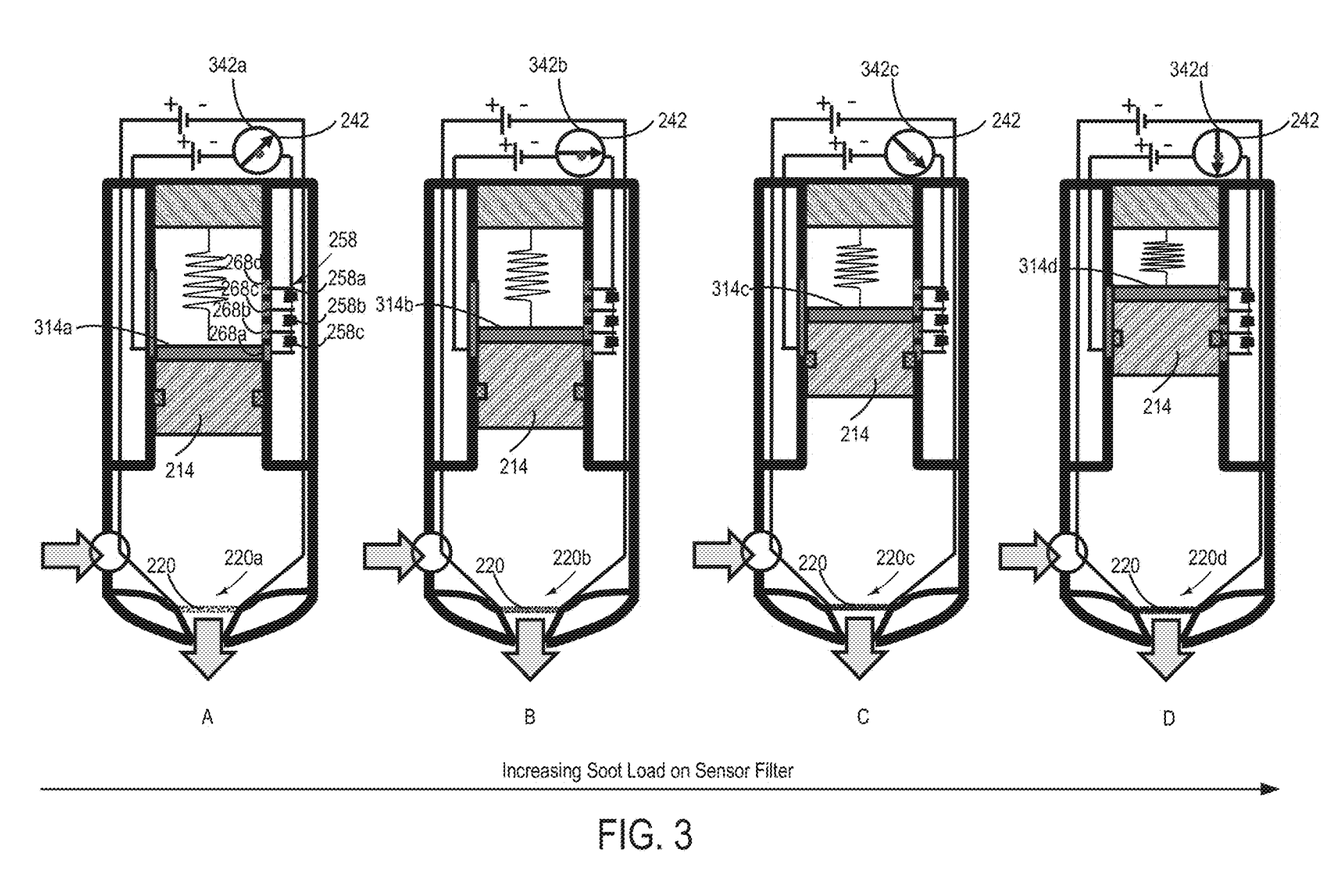
FIG. 3 shows an example embodiment of the pressure based soot sensor with increasing soot load.

Turning now to FIG. 3, an example embodiment of the pressure based soot sensor assembly 300 of with increasing soot load on the sensor filter is shown. Specifically, the embodiment shows how soot sensor assembly 200 responds to increasing soot load levels relative to electrical resistance and piston position, whose conductive surface is located in electric circuit 254.

Embodiment A shows the soot sensor under a relatively clean soot sensor filter 220 (of FIG. 2) condition 220a as measured by a resistance threshold of a clean filter, R_clean. With less soot deposit in the filter, the filter flow permeability is relatively higher, and pressure in bottom chamber 208 of FIG. 2 is too low to translate piston 214 upward. Piston 214 of FIG. 2 is therefore at its lowest (resting) position, 314a. In this position, conductive surface 218 of piston 214 is electrically coupled with conductive surface 268a. Conductive surface 268a is connected via electric wire to resistive elements 258. In position 314a, current flows through resistors 258a, 258b, and 258c. The current passes through the resistors, and is read by the voltage sensor before looping back to the negative terminal of the voltage source 264. Voltage sensor 242 measures the resistance in the current (via voltage). Thus, when piston 214 is in position 314a, its lowest position, the electrical resistance will be at the highest value because the current passed through all three resistors.

Embodiment B shows the soot sensor under a low (compared to embodiments C and D) soot deposit condition 220b. As soot accumulates onto soot filter 220, filter flow permeability decreases. As a result, pressure inside chamber bottom chamber 208 increases. This in turn pressurizes piston 214 upward. Piston 214 is now in position 314b. In this position, the piston's conductive surface 218 is coupled with conductive surface 268b. Conductive surface 268b is connected via electric wire to resistive elements 258. In position 314b, current flows through resistors 258a and 258b. As previously stated therein, this current will be measured by voltage sensor 242. Thus, when the filter is in a low soot deposit condition, the electrical resistance is slightly lower because the current passes through two resistances when piston 214 is in position 314b.

Embodiment C shows the soot sensor under an intermediate soot deposit condition 220c relative to the other embodiments. Filter flow permeability decreases further, and pressure increases. This increased pressure pushes piston 214 to position 314c. In this position, the piston's conductive surface 218 is coupled with conductive surface 268c. Conductive surface 268c is connected via electric wire to resistive elements 258. In position 314c, current flows through resistor 258a. When the filter is in an intermediate soot deposit condition, electrical resistance will be lower still, because the current has passed through just one resistor.

Embodiment D shows the soot sensor under the highest soot deposit condition 220d. Piston 214 is pushed up to highest position, 314d. In this position, the piston's conductive surface 218 is coupled with conductive surface 268d. Conductive surface 268d is connected via electric wire to resistive elements 258. In position 314d, current may not flow through a resistor. Thus, when the soot sensor filter has accumulated a predetermined threshold of soot load, electrical resistance will be at its lowest level. A controller coupled to the soot sensor may signal soot sensor regeneration to start, via electrical heat provided by electric circuit 256, when voltage sensor 242 measures an electrical resistance lower than threshold value, R_regen.

Thus, one embodiment of a pressure-based soot sensor assembly is introduced herein featuring a sensor housing, which may be cylindrical, including an exhaust inlet, an exhaust outlet, and a soot filter affixed across the exhaust outlet. The exhaust outlet may be parallel with the conductive piston surface and also may be perpendicular to the exhaust outlet.

Further, the system may comprise a piston within the housing, affixed to a spring via a conductive surface, with the spring fluidly separated from the exhaust chamber by a piston seal.

The system may further comprise a particulate filter coupled upstream of the sensor in an exhaust passage of an internal combustion engine.

Further still, the system may comprise a detection circuit including the conductive surface of the piston and a plurality of resistive elements, as well as a separate regeneration circuit configured to supply electric heat across the soot filter to regenerate the sensor. Further, the system may comprise a processor including instructions stored in non-transitory memory. The instructions may include instructions to receive soot level data from the detection circuit and to send a regeneration signal to the regeneration circuit responsive to the soot level data. The processor may further have instructions to measure a time between regenerations of the sensor soot filter.

In this way, the system described above may be operationally coupled to a processor to operate as a soot sensor positioned downstream of a particulate filter. In one example, exhaust gas enters the soot sensor assembly via an upstream facing inlet to increase pressure inside the soot sensor, which acts upon a translated piston. Exhaust gas may exit the sensor via an exhaust outlet that is perpendicular to an exhaust inlet, thereby reducing the potential for large particulate or water drop impingement and uneven exhaust flow, for example. In turn, reducing the potential for impingement may, for example, reduce difficulty for the soot sensor to reach regeneration temperature due to the aforementioned impingements. The system may further collect soot particles from the introduced exhaust gas on a sensor surface to increase pressure inside the sensor. This pressure acts upon a translated piston whose conductive surface is coupled to a plurality of resistive elements comprising a detection circuit of the soot sensor assembly. Upon reaching a resistance threshold, as measured by a voltage sensor in a detection circuit, a processor may signal a separate regeneration circuit in the sensor assembly to provide electric heat to burn off, or incinerate, soot particles in a sensor surface. Further, the soot sensor may regenerate each time the soot accumulation increases the pressure inside the soot sensor to a threshold level. The processor may have instructions to measure times in between soot sensor regenerations. Thus, a soot sensor positioned downstream of a particulate filter regenerates according to indicated soot level in an exhaust passage of an internal combustion engine. Therefore, the repeatability and function of the soot sensor regeneration may not be degraded as substantially by non-uniform soot deposit on the sensor surface. For example, by correlating the pressure rise with soot storage, rather than current and/or voltage correlations, the sensor may be less sensitive to aberrant storage distribution levels on the surface.

FIG. 4 illustrates an example routine 400 for adjusting filter operation based on feedback from a pressure-based sensor assembly 200 positioned downstream of a particulate filter in an engine exhaust. Specifically, the routine uses a pressure-based sensor regeneration process of the sensor assembly to update and regenerate the DPF via a coupled processor.

At 402, the routine includes confirming that the engine is running. This may be confirmed, for example, by whether the engine is undergoing combustion, rotating greater than a threshold non-zero speed, etc. If the engine is not running, the routine may end. A pressure based soot sensor assembly 200 (FIG. 2) is downstream of a particulate filter, DPF 102 (FIG. 1) in an exhaust passage of an internal combustion engine. Thus, during engine running, exhaust gas exits the particulate filter, enters the sensor assembly through an opening, and exits only by passing through the sensor surface, a disk-like filter, comprised of metal fibers for example, that is affixed across the exhaust outlet. Therefore, particulate matter from the exhaust gas collects on a sensor surface downstream of a particulate filter to increase pressure inside the sensor, wherein the opening faces upstream (faces outlet surface of particulate filter), and where the exit faces radially in a centerline of the exhaust passage. Further, an exhaust outlet of the sensor assembly may be perpendicular an exhaust inlet and parallel to the conductive surface of a piston.

At 404, change in electrical resistance of the soot sensor may be monitored by the control system. This can be done, for example, by a controller recording the readings of the voltage sensor on the soot sensor, and determining whether levels are increasing, decreasing, or staying steady. A controller may convert the voltage readings into the amount of resistance or a current. Alternatively, a controller may monitor change in voltage, which may also follow the same steps in this method and may determine congruent results and operations. However, voltage versus time can express an inverse relationship to that of resistance versus time. Resistance changes depending on the soot load of the sensor. Electrical resistance may be monitored by a processor coupled to the sensor, with instructions stored in non-transitory memory to receive soot-level data from the detection circuit (electric circuit 254 of FIG. 2), which is coupled to a voltage sensor.

At 406, the amount of soot load deposited on the soot sensor filter may be determined by the change in electrical resistance (or alternatively, change in voltage) as well as based on additional operating parameters, such as exhaust temperature, engine speed/load, etc. For instance, a high electrical resistance may indicate a low soot deposit, an intermediate electrical resistance may indicate an intermediate soot deposit, and a low electrical resistance may indicate a high soot deposit. However, these estimates may be further adjusted based on exhaust temperature and engine speed/load, to account for exhaust pressure changes caused by parameters other than soot loading of the soot sensor filter, if desired. As explained herein, increasing soot accumulation in the soot filter increases pressure in the soot sensor assembly, thereby acting upon a translated piston, a translated position measured via electrical contacts having variable resistance (FIG. 3). The piston is translated by the compression of a spring, which is affixed to the piston's conductive surface, and fluidly separated from the exhaust chamber by a piston seal. Further, the conductive surface of the piston works effectively as part of a detection circuit in the cylindrical sensor housing. Further still, a processor coupled to the sensor may record these electrical resistances detected on a detection circuit, which are indicative of the soot load of the sensor, during certain times. The processor may also record the times in between regenerations of the sensor.

At 408, it may be determined whether the electrical resistance of the soot sensor is less than that of the threshold, R_regen. If yes, then at 410 the system adjusts parameters to regenerate the soot sensor. This may be done by electrically heating soot filter 220 via a regeneration circuit (such as electric circuit 256 of FIG. 2). The processor may have stored instructions to send a regeneration signal to the regeneration circuit responsive to the soot level data. After regenerating the soot sensor, at 414 it can be determined whether electrical resistance is greater than the threshold R_clean. If no, further soot sensor regeneration may be requested at 416. Thus, from 410 to 416 the processor may have instructions to repeatedly regenerate the sensor surface to indicate soot level responsive to a translated piston upon which the pressure acts. For example, a processor may send signals to the regeneration circuit to regenerate the sensor when resistance is less than a threshold R_regen, caused by increased pressure from soot accumulation acting upon a piston electrically connected to resistive elements. Therefore, a repetition of soot sensor regenerations may indicate overall soot level condition, where shorter duration of time in between regenerations may indicate a high soot level condition, for example. In this way, soot load in exhaust may be determined at 418 by the duration time in between regenerations of the soot sensor.

In comparison, if electrical resistance is not lower than the threshold resistance, R_regen, then it may be inferred that there is sufficient filter flow permeability in soot filter 220 (FIG. 2). Thus the filter has not reached its soot deposit capacity and regeneration is not required. Continue to determine soot load of soot sensor based on change in electrical resistance.

At 420, the processor may have instructions to diagnose the condition of the soot sensor. If the indicated soot level of 418 is less than a minimum threshold after a threshold number of sensor regenerations, than degradation of soot sensor is indicated. For example, the controller may set a flag or malfunction indication light on diagnostic code. End sensor regeneration at 422.

Upon regeneration of soot sensor, an estimate of the total soot load of DPF 102 (FIG. 1) may be updated based on the total soot load of soot sensor at 424 as indicated by the piston deflection. In one example, each cycle of accumulation and regeneration of the soot sensor indicates a stepwise increase of the soot load of the DPF, until regeneration of the DPF occurs. Thus, the sensor surface is regenerated more often than the particulate filter. At 426, it may be determined if the soot load of the DPF is greater than the threshold. If yes, then at 428, regenerate DPF. For example, regenerating the DPF may include heating the filter via the flow of hot exhaust gas there-through, or producing high amounts of NOx to oxidize the soot. At 432, the DPF may be further diagnosed based on change in electrical resistance of soot sensor (FIG. 5). If the soot load of the DPF is lower than the threshold, than DPF may not need to be regenerated (430). Thus, the method comprises of regenerating the particulate filter responsive to the indicated soot level. Continue to update soot load of DPF based on soot load of sensor.

FIG. 5 illustrates an example routine 500 for diagnosing DPF function based on the regeneration time of the soot sensor.

At 502, it may be calculated by a processor, through calibration, the time of regeneration for the soot sensor, t(i)_regen, which is the time measured from end of previous regeneration to the start of current regeneration of the soot sensor. At 504, compare t(i)_regen to t(i−1)_regen, which is the previously calibrated time of regeneration of the soot sensor. From this, it may be inferred that the soot sensor may need to cycle through regeneration multiple times in order to diagnose the DPF. If the t(i)_regen is less than half the value of t(i−1)_region, then at 508 indicate DPF is leaking, and DPF degradation signal is initiated. Alternatively, or additionally to the process mentioned above, the DPF may be diagnosed using other parameters, such as exhaust temperature, engine speed/load, etc. The degradation signal may be initiated by, for example, a malfunction indication light on diagnostic code.

A current regeneration time of less than half of the previous regeneration time may indicate that the time for electric circuit 254 to reach the R_regen threshold is shorter, and thus the frequency of regeneration is higher. Higher frequency of regeneration in the soot sensor may indicate that the outflowing exhaust gas is composed of a higher amount of particulate matter than realized with a normally functionally DPF. Thus, if the change of regeneration time in the soot sensor reaches threshold, t_regen, in which the current regeneration time of the soot sensor is less than half of that of the previous regeneration time, a DPF degradation, or leaking, is indicated, for example via a display to an operator, and/or via setting a flag stored in non-transitory memory coupled to the processor, which may be sent to a diagnostic tool coupled to the processor. If the change of regeneration time in the soot sensor does not reach threshold t_regen, then at 506 DPF leaking is not indicated.

FIG. 6 shows a graphical depiction of the relationship between soot sensor regeneration and the soot load of the DPF, specifically how soot sensor regeneration may indicate DPF degradation. Vertical markers t0, t1, t2, t1', and t2' identify significant times in the operation and system of soot sensor assembly and particulate filter.

The first plot from the top of FIG. 6 shows electrical resistance of the soot sensor. As previously described, electrical resistance of the soot sensor may decrease with increasing soot load of the soot sensor, and may increase with a decreasing soot load. Electrical resistance is at its lowest value at the bottom of the plot and increases in magnitude toward the top of the plot in the direction of the Y axis arrow. The X axis represents time and time increases from the left to the right side of the plot. Horizontal marker 602 represents the threshold resistance of a clean soot sensor filter, R_clean, in the second plot. Horizontal marker 604 represent the threshold resistance of soot sensor regeneration, R_regen in the second plot.

The second plot from the top of FIG. 6 shows soot load of DPF. Time starts at the left side of the plot and increases to the right. Soot load of DPF is at its lowest value at the bottom of the plot and increases toward the top of the plot in the direction of the Y axis arrow. Horizontal marker 606 represents the threshold of the DPF soot load in the second and third plot. In one example, the DPF will regenerate by exhaust gas heat when its soot load is greater than threshold 606.

The third plot from the top of FIG. 6 shows soot load of DPF, with the same parameters as the second plot. This plot of is an alternative example of soot load accumulation and regeneration, which may be incremented stepwise.

At time t0, the soot sensor is in a relatively clean soot filter condition, as measured by high resistance threshold R_clean. When a controller coupled to the soot sensor processes this threshold, it may send instructions to regeneration circuit 256 to end supplying heat, so that detection circuit 254 may begin detecting soot load accumulation. As soot load increases on the sensor filter, pressure builds inside the sensor, translating a piston whose conductive surface is attached to a detection circuit with a plurality of resistive elements. The larger the soot load, the higher the pressure inside the sensor assembly, the more a piston may be translated upward, and the less resistors its conductive surface may be coupled to in a detection circuit. Thus voltage sensor 242 of electrical circuit 254 reads a lower resistance. Therefore, resistance may drop with increasing soot load on the sensor filter. As time passes, soot continues to accumulate and resistance decreases accordingly. Thus, the processor may be able to calculate mass of soot load present in soot sensor by change in resistance over time at any one time.

At time t1, electrical resistance reaches a threshold 604 (R_regen), and regeneration of the soot sensor is indicated. A processor coupled to the sensor may have instructions to send a regeneration signal to a regeneration circuit, responsive to the soot level data. For example, the signal may be indicated when resistance in electric circuit 254 is measured to be below threshold R_regen. Congruently, at time t1, the DPF updates, indicating an accumulation of soot in its filter as shown in the second plot. Similarly, the third plot shows the soot load of the DPF incremented stepwise. The soot accumulation on a DPF filter corresponds with time difference in between soot sensor regenerations in the first plot. The soot load of DPF continues to increase through multiple cycles of soot sensor accumulation and regeneration. Thus, the sensor filter is regenerated more often than the particulate filter.

At time t2, electrical resistance is once again lower than threshold 604, and regeneration of the soot sensor is indicated. The soot load of DPF has accumulated to the point of threshold 606, R_DPF. This may signal the DPF to regenerate its filter, for example, by burning to reduce the collected particulates. In one example, an engine controller may initiate DPF filter regeneration based on input received from the soot sensor and/or based on other operational parameters such as exhaust temperature, engine speed/load, etc. As explained herein, the controller may have instructions for DPF regeneration based on a threshold number of soot sensor regenerations, wherein the controller may record the time in between successive soot sensor regeneration to diagnose DPF condition. Time difference d1 shows the amount to time that has passed between t1 and t2. This indicates the amount of time that has taken the DPF to regenerate, based on a threshold number of soot sensor regenerations, wherein the DPF has reached its threshold soot load.

It may be appreciated in the plots that after this point an indeterminate amount of time has passed where the soot sensor and DPF continue to operate. Times t1' and t2' also indicate the same conditions as times t1 and t2. However, time difference d2 is significantly shorter than time difference d1. Slope 628 of regeneration cycles 614 is significantly steeper than that of slope 626 of regeneration cycles 610. The sharp increase of steepness indicates that the soot sensor is regenerating at a higher frequency, indicating a soot concentration that is higher than the soot concentration of regeneration cycles 610. The time for the electrical resistance to reach threshold resistance R_regen is shorter. Thus, the same number of regeneration cycles occur as in 606, but under a shorter amount of time. Congruently, the slope of 612 is steeper than the slope of 608, indicating a greater soot load accumulated in the same amount of time in particulate filter. From this, it may be inferred that DPF function is not normal. A processor may include instructions to a measure a time between regenerations of the soot sensor filter. In one example, if current regeneration time is less than half of the previous one, a DPF degradation signal is initiated. Regeneration cycles 610 shows the DPF and soot sensor function under normal conditions, and regenerations cycles 614 shows the DPF and soot sensor functioning under DPF leaking conditions.

In this way, it may be possible to regenerate a soot sensor positioned downstream of a particulate filter via a soot sensor assembly coupled to a processor. The processor may have instructions to activate a regeneration circuit within the assembly responsive to a threshold level of resistance (as well as based on additional operating parameters, such as exhaust temperature, engine speed/load, etc.), wherein the repetition of soot sensor regenerations may indicate soot level responsive to a translated piston upon which the pressure acts. Specifically, the time durations in between soot sensor regenerations may be used to indicate soot level in an exhaust passage, and may therefore be used to regenerate a particulate filter responsive to the indicated soot level. In this way, since the soot sensor may correlate pressure rise with soot storage, rather than current and/or voltage correlations related to conductivity across a gap or other similar structure, the sensor may be less sensitive to aberrant soot distribution levels. Thus, by reducing the need for soot to accumulate in an electric circuit as just described, which can experience poor soot distribution and therefore affect sensor function, this pressure-based soot sensor system may increase the sensor's sensitivity and accuracy in detecting DPF degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    collecting soot particles on a sensor surface downstream of a particulate filter to increase pressure inside the sensor;
    repeatedly regenerating the sensor surface to indicate soot level responsive to a translated piston upon which the pressure acts, the indication of the soot level based on a duration between regenerations of the sensor; and
    regenerating the particulate filter responsive to the indicated soot level, wherein exhaust exits the sensor via an exhaust outlet that is perpendicular to an exhaust inlet.

2. The method of claim 1 wherein the sensor surface is regenerated more often than the particulate filter.

3. The method of claim 1 wherein the piston is translated within a cylinder in the sensor, a translated position measured via electrical contacts having variable resistance.

4. The method of claim 1 wherein exhaust exits the particulate filter and then enters the sensor through an opening, and exits only by passing through the sensor surface.

5. The method of claim 4 wherein the sensor surface comprises metal fibers.

6. The method of claim 4 wherein the opening faces upstream, and where an exit through the surface faces radially into a centerline of an exhaust passage.

7. The method of claim 1 wherein the sensor surface is a disk-shaped, porous sintered metal without any through holes.

8. A method, comprising:
    collecting soot particles on a sensor surface downstream of a particulate filter to increase pressure inside the sensor;
    repeatedly regenerating the sensor surface to indicate soot level responsive to a translated piston upon which the pressure acts; and
    indicating degradation of the sensor when the indicated soot level is less than a minimum threshold after a threshold number of sensor regenerations.

9. The method of claim 8 wherein exhaust exits the sensor via an exhaust outlet that is perpendicular to an exhaust inlet.

10. A method, comprising:
    collecting soot particles on a disk-shaped sensor surface acting as a sensor outlet, a sensor downstream of a particulate filter to increase pressure inside the sensor, exhaust gas entering the sensor via an upstream-facing inlet;
    repeatedly regenerating the sensor surface to indicate soot level responsive to a translated piston upon which the pressure acts; and
    regenerating the particulate filter responsive to the indicated soot level, wherein the indication of the soot level is based on a duration between regenerations of the sensor, wherein the piston is translated within a cylinder in the sensor, a translated position measured via electrical contacts having variable resistance.

* * * * *